United States Patent [19]
Hosking et al.

[11] 3,848,974
[45] Nov. 19, 1974

[54] HEAD-UP DISPLAY APPARATUS

[76] Inventors: John Trevor Hosking, Lilac Cottage, Austenwood Ln., Gerrards Cross, Buckinghamshire; Norman Blackham, Lane Farm, Sewell, near Dunstable, Bedfordshire, both of England

[22] Filed: Jan. 29, 1973

[21] Appl. No.: 327,532

[30] Foreign Application Priority Data
Jan. 28, 1972  Great Britain............... 4250/72

[52] U.S. Cl. .................................. 350/174, 353/14
[51] Int. Cl. .................................. G02b 27/18
[58] Field of Search ............ 350/174; 356/251, 252; 353/13, 14

[56] References Cited
UNITED STATES PATENTS

| | | | |
|---|---|---|---|
| 2,441,160 | 5/1948 | Martin | 356/251 |
| 2,490,747 | 12/1949 | Creighton | 356/251 |
| 2,566,389 | 9/1951 | Walk | 356/251 X |
| 2,641,159 | 6/1953 | Mihalakis | 353/14 |
| 2,750,833 | 6/1956 | Gross | 356/251 |
| 3,446,916 | 5/1969 | Abel et al. | 350/174 X |
| 3,498,725 | 3/1970 | Burrows et al. | 350/174 X |
| 3,589,796 | 6/1971 | Schaefer | 350/174 |
| 3,609,023 | 9/1971 | Turboult et al. | 353/13 |
| 3,679,297 | 7/1972 | Searle et al. | 350/14 |
| 3,697,154 | 1/1972 | Johnson | 350/174 |

Primary Examiner—David H. Rubin
Attorney, Agent, or Firm—Elliott I. Pollock

[57] ABSTRACT

Head-up display apparatus to provide an indication of the speed of an automobile includes a curved windscreen on which the indication is displayed in the driver's line-of-sight. The apparatus includes a speedometer scale attached to the shaft of a speedometer movement, a light source, and an optical assembly, having a diverging lens and a curved mirror, to project the speedometer display on to the windscreen. The speedometer scale is positioned by the speedometer movement so that the numeral on the scale representing the speed of the automobile is illuminated by the light source. The combined optical characteristics of the optical assembly and the curved windscreen are arranged so that the image appears to the driver to be focussed at a position between 6 and 20 feet ahead. The colour of the display may be varied in accordance with the driving conditions.

17 Claims, 9 Drawing Figures

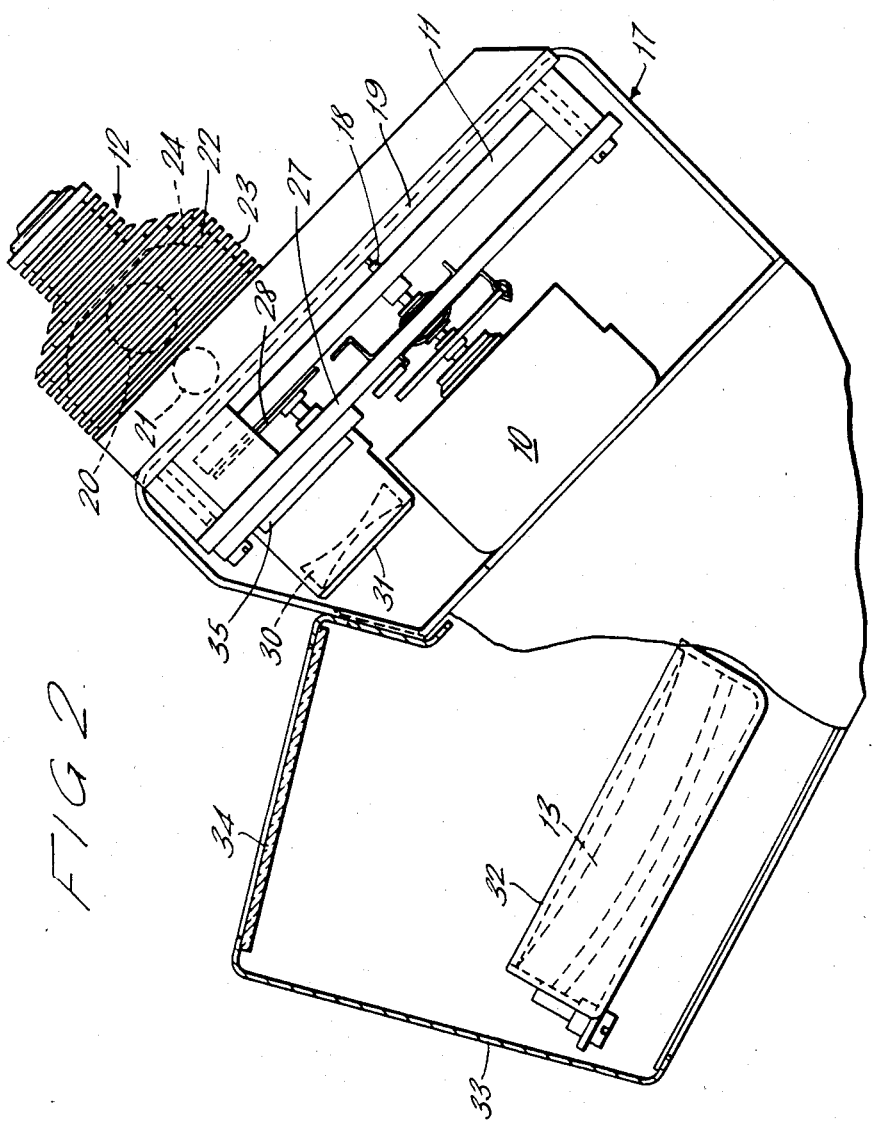

HEAD-UP DISPLAY APPARATUS

This invention relates to head-up display apparatus.

Such apparatus is used, for example, to provide the pilot of an aircraft with a display of information which he can consult without having to divert his line-of-sight from the scene ahead of the aircraft. The head-up display apparatus comprises generally a display-producing means (usually a cathode-ray tube) for producing the display of information and a collimator which focuses the display of information at infinity. In a common arrangement, when the apparatus is fitted, for example, in an aircraft, the collimator projects the display of information onto a flat, partially-transparent reflector which is disposed in the line-of-sight of the pilot. The reflector is inclined so that the display of information projected onto the reflector appears in the line-of-sight of the pilot. Thus, the pilot sees the collimated display of information against a background of the scene visible through the windscreen of the aircraft, and he may shift his attention from the display to the scene and back without any need for refocussing of his eyes. The reflector must be flat to ensure that the collimation of the display of information is not disturbed.

Head-up display techniques may be advantageously employed in other situations. For example, the driver of an automobile must always maintain adequate vigilance over the road conditions ahead of the vehicle, particularly in heavy traffic or bad weather. However, in most modern cars the instruments, including the speedometer, are mounted in a position which requires the driver to divert his line-of-sight from the road ahead and refocus his eyes before he can consult those instruments. Since this can be very distracting and tedious, the driver may tend to rely on his own, probably very inaccurate, subjective judgement of the speed of the vehicle. This tendency to ignore the speedometer will most likely occur in complicated road conditions which demand the driver's uninterrupted attention. However, it is in such conditions that precise knowledge of the vehicle's speed is in fact vitally important.

Although the head-up display apparatus described above is generally very acceptable for aviation use, it is relatively expensive and is not therefore suitable for use in, for example, automobiles. Also, the extent to which the person viewing the display may move his head while keeping the display in sight is limited by the dimensions of the partially-transparent reflector. If the reflector were made large enough to avoid this problem, it would become unacceptably obtrusive and also further increase the cost of the apparatus.

According to one aspect of the present invention there is provided a head-up display apparatus for a craft, including means for producing a display of information, and means for projecting the display of information, wherein the apparatus also includes a curved windscreen for the craft on to which the display of information is to be projected by the display-projecting means to appear in an observer's line-of-sight, and wherein the optical characteristics of the display-projecting means are selected in accordance with the curvature of the windscreen so as to enable the display of information projected on to the windscreen in the said line-of-sight to appear to the observer as emanating from a position which is a finite distance in front of the observer.

The said finite distance may be in the range of 6 to 20 feet.

Preferably the optical means includes a curved mirror, and, in such a case, the curved mirror may be a spherical mirror.

The optical means may include a diverging lens disposed in an optical path between the display-producing means and the curved mirror.

The optical means may include a planar mirror which is to be disposed in an optical path between the curved mirror and the windscreen.

The windscreen may be a laminated windscreen.

According to a further aspect of the present invention there is provided a craft including a head-up display apparatus as specified in any one of the preceding six paragraphs.

Two forms of head-up display apparatus in accordance with the present invention and including an assembly for projecting onto a windscreen of an automobile an indication of its speed will now be described, by way of example, with reference to the accompanying drawings in which:

FIG. 2 is a side view showing in more detail the assembly of FIG. 1;

Figure 1:
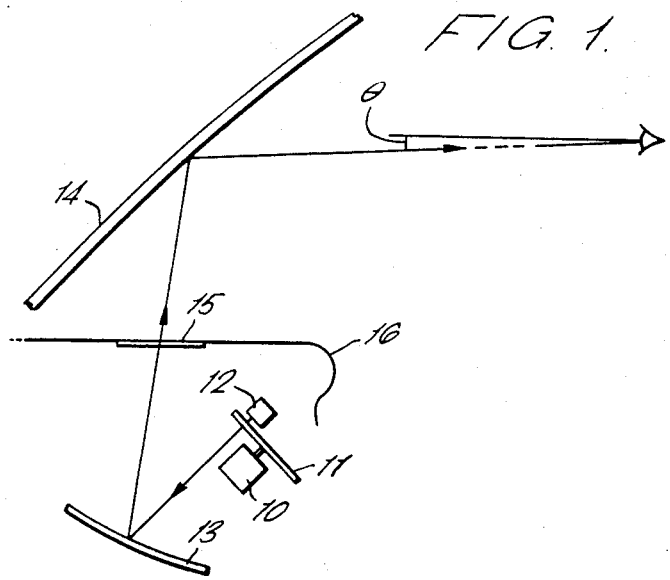
FIG. 1 is a diagrammatic view of one form of the head-up display apparatus.

Referring to FIG. 1, the head-up display apparatus includes a conventional movement 10 of a speedometer which is coupled to the automobile transmission by means of a flexible drive cable or a gear mechanism so as to cause an output shaft of the movement 10 to be displaced about its axis through an angle proportional to the speed of the automobile. The output shaft of the movement 10 carries a disc 11 having an arcuate speedometer scale formed around its periphery. The speedometer scale is conventional in layout and, conveniently, the disc 11 is of transparent material and is coated with opaque paint, the numerals of the speedometer scale being formed by appropriately shaped gaps in the coating of opaque paint. A light source 12 is provided to illuminate a predetermined arcuate length of the scale formed on the disc 11, and the angular position of the disc 11 on the output shaft of the movement 10 is selected so that, at any particular angular position of the output shaft of the movement 10, the speed indicated at the center of the illuminated length of the scale corresponds to the automobile speed. The illuminated speedometer display is projected onto a curved windscreen 14 (which is preferably of the laminated type) by a spherical mirror 13. The light-rays reflected by the mirror 13 pass through a glass window 15 in a dashboard coping 16 of the automobile. The mirror 13 is positioned so that the speedometer display is projected onto that portion of the windscreen 14 which is disposed in the normal, line-of-sight of the automobile driver. More particularly, the speedometer display is so positioned on the windscreen 14 that the center of the display will be aligned with the driver's line-of-sight when depressed through an angle θ from the horizontal line-of-sight. In practice, this angle θ is preferably between five and ten degrees of arc. The automobile driver thus views the projected display against the background of the scene visible through the windscreen 14.

In previously known head-up display apparatus the projected display of information in the obsever's line-of-sight has always been focussed at infinity. However, it has been found that this can be disadvantageous in an automobile. If, for example the display provided in the driver's line-of-sight is collimated, the display may distract the driver when the automobile is approaching the brow of a hill. This is particularly the case at night. Furthermore, since the windscreen 14 is curved, other problems can arise, such as splitting of the projected display into two separate images. Therefore, it is proposed to overcome these difficulties by arranging that the projected display appears to the driver as emanating from a position which is a finite distance in front of the driver, this distance being selected so that, on the one hand, the driver does not need significantly to refocus his eyes to view the display, and, on the other hand, is not unnecessarily distracted by it. In the apparatus of FIG. 1 this distance is arranged to be in the range of six to twenty feet in front of the driver. In addition, with such an arrangement, it has been found that spherical aberrations caused by the mirror 13 are to some extent cancelled out by the curvature of the windscreen 14. The windscreeen 14 thus forms an essential optical component of the head-up display apparatus.

Referring to FIG. 2, the speedometer movement 10 is housed within a compartment 17 the side walls of which have been removed to simplify the drawing. The disc 11 is carried by an output shaft 18 of the movement 10, the end of the output shaft 18 remote from the movement 10 being journalled in a wall 19 of the compartment 17. The light source 12 comprises two lamps 20 and 21, with the lamp 21 being disposed between the lamp 20 and the disc 11. The lamp 20 is of the screw-in type, whereas the lamp 21 is in the form of an elongate cylinder with an electrical contact at each end, the filament extending between the electrical contacts along the axis of the cylinder.

It is necessary to vary the level of illumination of the light source 12 in accordance with variations in the ambient light level. It has been found that this variation in the level of illumination of the light source 12 may be effected more effectively when the light source 12 comprises two lamps than would be the case if only one lamp were provided. It is arranged that normally only the lamp 20 is in use, as this provides a sufficiently bright display under most ambient light conditions, but when necessary the output of the lamp 20 is augmented by the lamp 21. The lamps 20 and 21 may both be relatively cheap, low power types, and both are operated in a manner that makes optimum use of their characteristics. Furthermore, if the lamp 20 should fail, its function can be taken over by the lamp 21, which thus provides a standby facility and ensures continuity of the projected display.

The operation of the lamps 20 and 21 may be controlled automatically by a photo-electric cell positioned in the automobile so as to sense the ambient light level.

The lamps 20 and 21 are mounted within a tubular housing 22 having circumferential fins 23 to assist dissipation of heat generated by the lamps 20 and 21. The housing 22 has a reflector 24 for the lamp 20 of generally paraboloidal form which is shown in more detail in FIG. 4.

Figure 4:
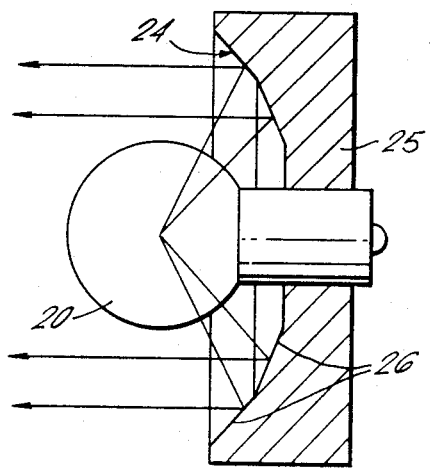
FIG. 4 is a sectional side view of a part of the assembly of FIG. 2.

Referring to FIG. 4, the reflector 24 is formed on a face of a body 25 of aluminum and comprises a plurality of annular surface portions 26 centered on the longitudinal axis of the housing 22 and inclined relative to one another so that the shape of the reflector 24 approximates to a paraboloid. The lightrays reflected by the reflector 24 tend to be more nearly parallel to one another than would be the case if the reflector 24 were in the form of a true paraboloid. This is because, in practice, the position of the filament in the lamp 20 varies considerably from lamp to lamp so that it is not possible accurately to position the filament at the focal point of the reflector 24. It has been found that the reflector 24 is more capable than a true parabolic reflector of accommodating different positions of the lamp filament.

Figure 3:
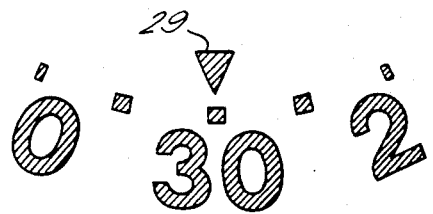
FIG. 3 shows one form of the display projected onto the automobile windscreen by the assembly of FIG. 2.

Referring again to FIG. 2, the output shaft 18 extends through a mounting plate 27 disposed on the side of the disc 11 remote from the light source 12. The mounting plate 27 carries an apertured masking plate 28, disposed between the disc 11 and the mounting plate 27, which serves to limit the angular extent of the projected display and also to provide a datum mark therein. The projected display is shown in FIG. 3 (in which the illuminated portions of the display are represented by the symbols), the datum mark being shown at 29. The angular extent of the projected display is arranged to be sufficient to enable the driver readily to ascertain whether the speed of the automobile is above or below the value shown by the numeral nearer to the datum mark 29. The light rays passing through the aperture in the masking plate 28 continue through an aperture in the mounting plate 27 and then through a diverging lens 30 before being reflected by the mirror 13. The lens 30 is mounted in a housing 31 supported on the mounting plate 27 and the lens 30 and the mirror 13 are positioned relative to the disc 11 so that the illuminated portion of the disc 11 is disposed at a location which corresponds approximately to both the focal point of the lens 30 and the disc of least confusion of the mirror 13. It has been found that by providing the lens 30, the size of the speedometer scale, for a given size of projected display, may be somewhat larger than would otherwise be the case, thereby simplifying considerably the manufacture of the disc 11. A further advantage is that the lens 30 increases the cut-off angle of the projected display as seen by the automobile driver, thereby increasing the extent to which the driver may move his head without losing sight of the display.

The position from which the projected display appears to emanate may be adjusted by varying slightly the spacings between the disc 11, the lens 30 and the mirror 13. Optimum sacings may be provided between these components such that the apparent position of the projected display will be an acceptable distance from the driver when the head-up display assembly of FIG. 2 is combined with any one of a range of windscreens having widely differing degrees of curvature.

The mirror 13 is mounted in a housing 32 which is in turn mounted in a casing 33 (the side wall of which has been partially cut away in FIG. 2) having a window 34 for the light-rays reflected from the mirror 13.

A coloured filter 35 is mounted in the housing 31 at the end thereof remote from the lens 30. It has been found that, for use in day-light, amber is a suitable colour for the filter 35. However, it is possible that for night-driving blue would be a more suitable colour. The filter 35 may, therefore, comprise both an amber filter and a blue filter, and be slidably mounted in the housing 31, the required filter being selected either manually or automatically. In the latter case, the filter 35 may, for example, be normally held by a spring in a position such that the amber filter is operatively positioned in the housing 31, and may be moved operatively to position the blue filter in the housing 31 under the control of a solenoid coupled to a light switch in the automobile.

Figure 5:
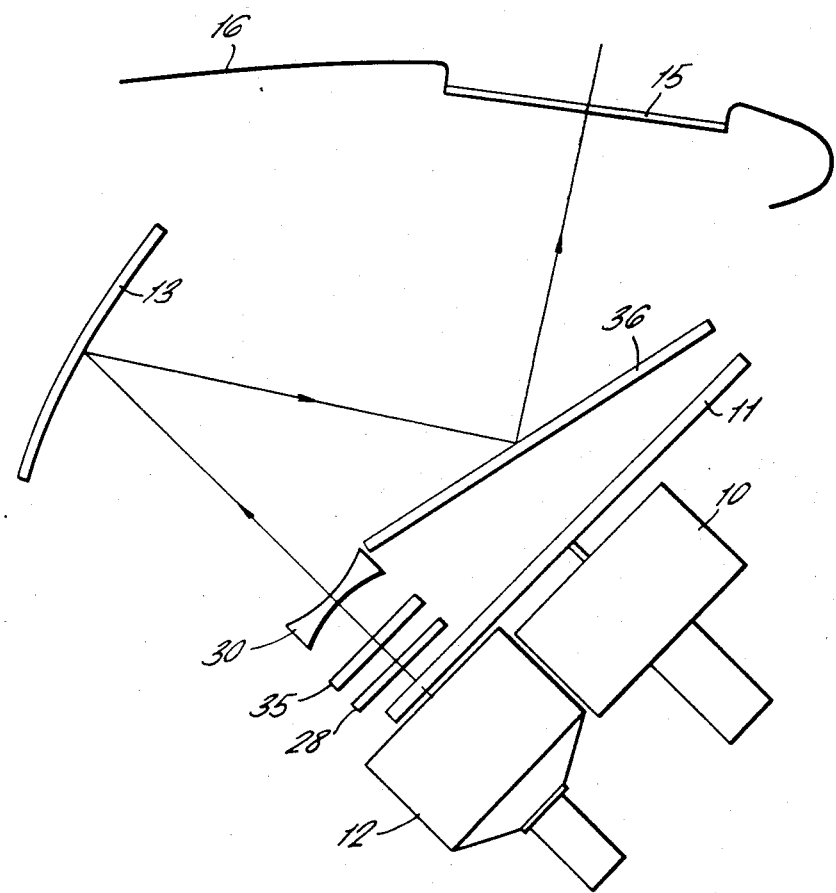
FIG. 5 is a diagrammatic view of an alternative form of the assembly.

An alternative form of the head-up display assembly is shown diagrammatically in FIG. 5. Referring to FIG. 5, the assembly is of similar form to the apparatus of FIGS. 1 and 2 except that the light-rays reflected by the spherical mirror 13 are further reflected by a planar mirror 36 before being projected onto the windscreen (not shown). With such an arrangement it has been found that the head-up display assembly can be more readily mounted beneath the dashboard coping 16.

Figure 6:
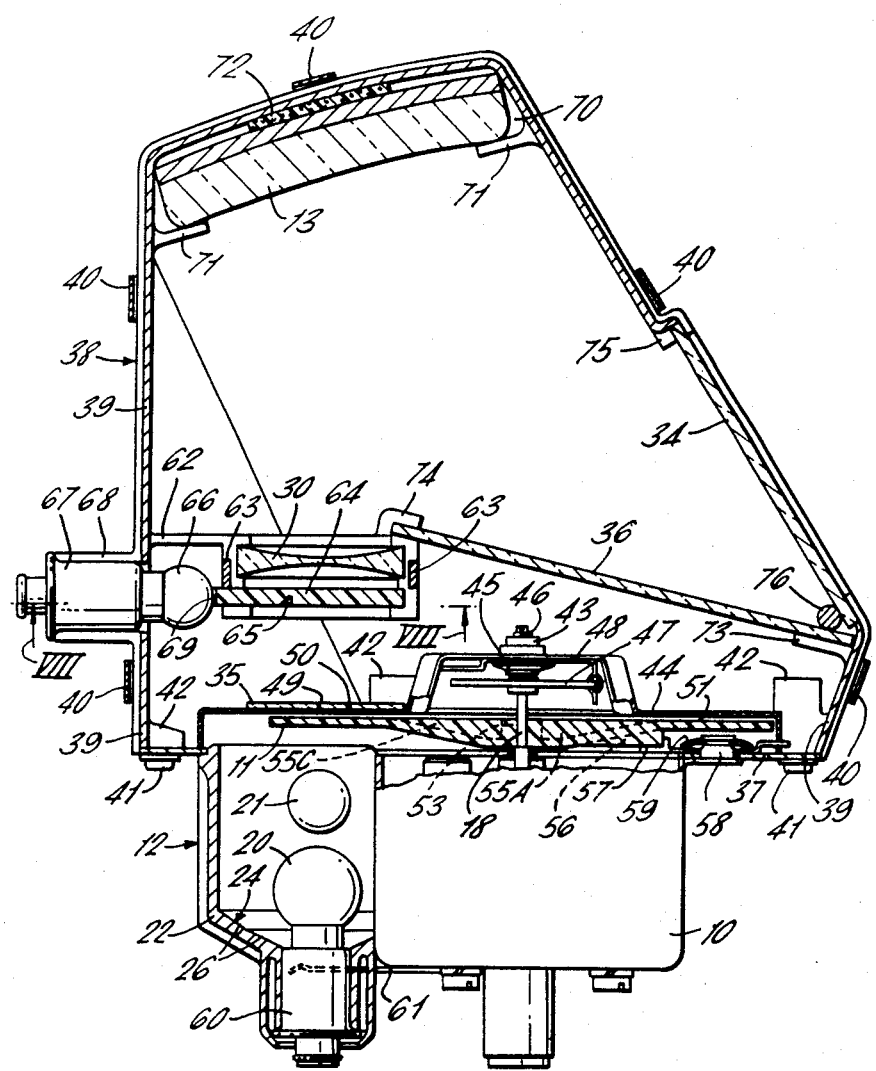
FIG. 6 is a part-sectional side view showing in more detail the assembly of FIG. 5.

The alternative form of the head-up display assembly is shown in more detail in FIG. 6, in which those parts of the assembly which correspond directly with parts of the assembly of FIG. 2 have been given corresponding reference numerals. Referring to FIG. 6, the speedometer movement 10 is mounted on an end-plate 37 of a moulded housing 38. The housing 38 is made as two separate parts, which are provided with flanges so that they overlap one another when they are connected together. The sectional view of FIG. 6 shows only one of these parts of the housing 38 with its flanges 39. The two parts of the housing 38 are held together by snap-action fasteners which take the form of hook-shaped resilient catches 40 on one part of the housing 38 which snap over and engage with respective projections on the other part of the housing 38 when the two parts are assembled together. The end-plate 37 is fastened to the housing 38 by self-tapping screws 41 which engage in bushes 42 moulded in the two parts of the housing 38.

The end of the output shaft 18 remote from the movement 10 is journalled in a bearing 43 which is held in place in a bridge piece 44 of metal by a circlip 45. The bearing 43 carries a screw 46 to enable the extent of the end-play of the output shaft 18 to be adjusted at the time of assembly. The output shaft 18 carries a hairspring 47, the tension of which is set by an arm 48 which is mounted on the bearing 43 for angular displacement relative thereto and which is retained in the desired angular position by the circlip 45.

The bridge piece 44 is fixed to the end-plate 37 and performs most of the functions of the mounting plate 27 and the masking plate 28 shown in FIG. 2. The filter 35 is carried by the bridge piece 44, and angular extent of the projected display and the shape of the datum mark 29 (FIG. 3) are determined by respective apertures 49 and 50 formed in the bridge piece 44 adjacent to the filter 35.

Figure 7:
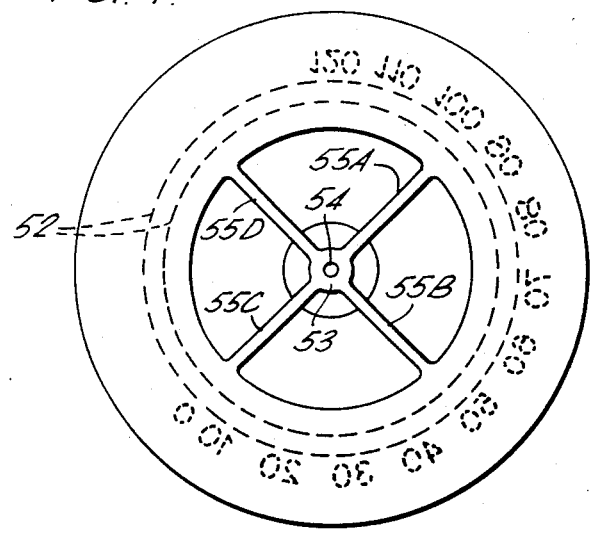
FIG. 7 is a plan view of a disc forming part of the assembly of FIG. 6.

The disc 11 is disposed between the end-plate 37 and the bridge-piece 44. Opaque paint delineating the numerals of the speedometer scale is coated on the side 51 of the disc 11 remote from the light source 12 and the movement 10. The layout of the numerals is shown schematically in FIG. 7, the numerals being provided by appropriately shaped gaps formed in the opaque coating on the side 51 of the disc 11. Additional gaps (not indicated) are provided in the opaque coating to produce the chaplets indicating the mid-points between the numerals. An annulus indicated by the dotted circles 52 is left clear of opaque paint to enable light to pass through the disc 11 to the aperture 50 in the bridge piece 44 (FIG. 6) to facilitate provision of the datum mark 29 shown in FIG. 3.

The light source 12 is located close to the disc 11, as shown in FIG. 6, and the disc 11 is shaped so as to avoid the necessity of providing a heat filter between the disc 11 and the light source 12. To this end, the disc 11 includes a dished portion, and a flat, annular ring-portion carrying the numerals and surrounding the dished portion. At the center of the disc 11 there is a concentric boss 53 having a central hole 54 for the output shaft 18. Four equally spaced ribs 55a–55D (shown in FIG. 7) extend radially across the dished part of the disc 11 and connect the boss 53 with the inner circumerence of the flat portion of the disc 11. This construction ensures that any stresses produced in the disc 11 by heat emanating from the light source 12 are more evenly distributed throughout the structure of the disc 11 than would be the case with a simple flat disc. The disc 11 is made of a transparent, heat-resistant material, for example, a polycarbonate material.

Referring to FIG. 6 again, the disc 11 has a radially extending ahoulder 56, which is formed on the side thereof adjacent to the movement 10 and which is radially aligned with the rib 55A, the shoulder 56 being urged into engagement with an adjustable zero stop 57 when the automobile is not in motion by the hairspring 47. The adjustable zero stop 57 is mounted on the end-plate 37 by means of a circlip 59 carried by a boss 58.

The light source 12 of FIG. 6 differs from the light source 12 of FIG. 2 in that parts of the housing 22 and the reflector 24 are cut away to permit the movement 10 to extend into the housing 22. By this means it has been found that a more compact arrangement can be achieved without significantly affecting the output of the light source 12. The lamp 20 is held in a lampholder 60 which is a push-fit in the housing 22. The housing 22 is retained in position on the end-plate 37 by a spring clip 61 which is mounted on the movement 10 and which resiliently bears on shoulders (not shown) formed on the housing 22.

The diverging lens 30 is held in a slot formed in a bracket 62 integral with the housing 38. The bracket 62 is moulded in two parts, one in each part of the housing 38, and locating pegs 63 provided on one of these parts ensure that the two parts of the bracket 62 are correctly aligned and linked with one another when the housing 38 is assembled. The bracket 62 has a second slot formed therein in which is mounted a transparent plate 64 of acrylic plastic to dispose the plate between the light source 12 and the lens 30. The plate 64 is for superimposing an image on the display provided by the speedometer disc 11 and to this end a wedge-shaped groove 65 is cut in the surface of the plate 64 facing the light source 12. The included angle between the faces of the groove 65 is forty-five degrees of arc, and one of the faces of the groove 65 is perpendicular to the surface of the plate 64 in which the groove 65 is formed. The groove 65 is positioned on the plate 64 so that none of the light-rays passing through the disc 11 will pass through the groove 65.

Figure 8:
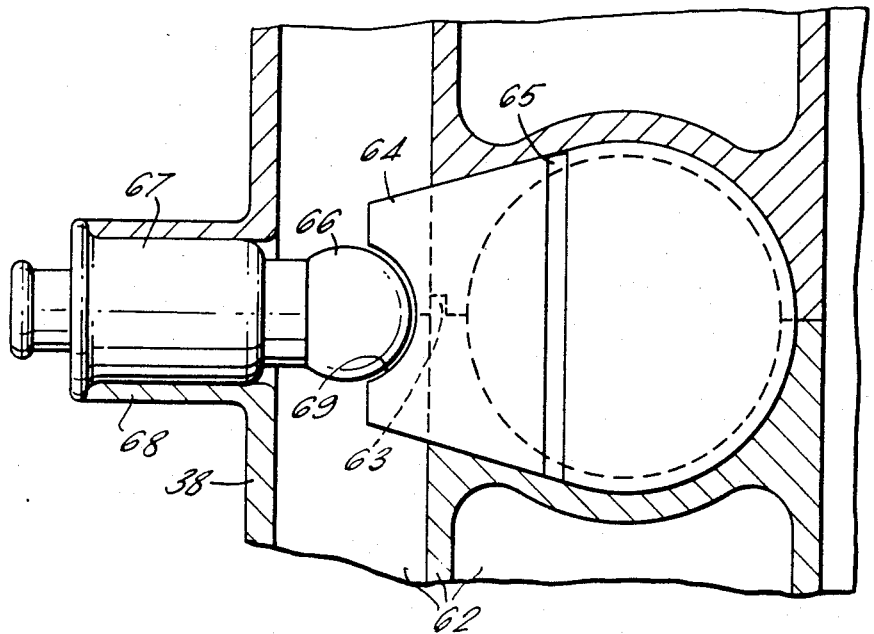
FIG. 8 is a fragmentary sectional view on the line VIII—VIII of FIG. 6.

The plate 64 is shown in plan view in FIG. 8. Referring to FIG. 8, a part of the plate 64 projects through the bracket 62 towards a lamp 66 mounted in a lamp-holder 67 which is a pushfit in a socket 68 formed in the side of the housing 38. The projecting part of the plate 64 has an arcuate recess formed therein into which the lamp 66 extends with a small space being provided between the lamp 66 and the plate 64. The edge 69 of the arcuate recess is coated with translucent red paint so that when the lamp 66 is illuminated, red light travels from the edge 69 of the recess through the image superimposition plate 64 to the inclined face of the groove 65, which it strikes at an angle of incidence of forty-five degrees. Since this angle of incidence is greater than the critical angle for total internal reflection to occur, all the light incident on the inclined face of the groove 65 will be reflected through an angle of ninety degrees towards the lens 30. After the light has passed through the rest of the optical system of the head-up display apparatus, it causes a bright red bar to appear in the projected display just below the speedometer numerals. The supply of electric power to the lamp 66 may be controlled by a monitoring system that senses the state of a parameter of each of those parts of the automobile in which a catastrophic failure could occur, such as, for example, the engine lubrication and cooling systems, the battery charging system and the braking system. If the monitoring system detects a condition of failure, or imminent failure, in such a system in the automobile, the lamp 66 is illuminated so that the bright red warning signal appears in the projected display. This indicates to the driver that a potentially dangerous situation exists and that he should stop the automobile immediately and investigate and remedy the situation.

Referring again to FIG. 6, the mirror 13 is mounted in a compartment 70 formed at the end of the housing 38 remote from the end-plate 37 by flanges 71 which project from the sides of the housing 38. A pad 72 of polyurethane foam urges the mirror 13 into contact with the flanges 71 to provide a secure, resilient support for the mirror 13.

The mirror 36 extends from the bracket 62, where it is secured in a slot between the bracket 62 and a flange 74, to one side of the window 34 of the housing 38, where it is mounted between a flange 73 and a rod 76. The rod 76, which is integral with the housing 38, also serves to support one end of the window 34 in contact with the wall of the housing 38. The other end of the window 34 is held in a slot between a flange 75 and the wall of the housing 38.

When the head-up display assembly of FIG. 6 is being assembled, the mirror 13, the lens 30, the window 34, the mirror 36 and the image superimposition plate 64 are all placed in the appropriate positions in one part of the housing 38, and then the other part is clipped into position. Thereafter the end-plate 37 may be screwed to the assembled housing 38.

Figure 9:
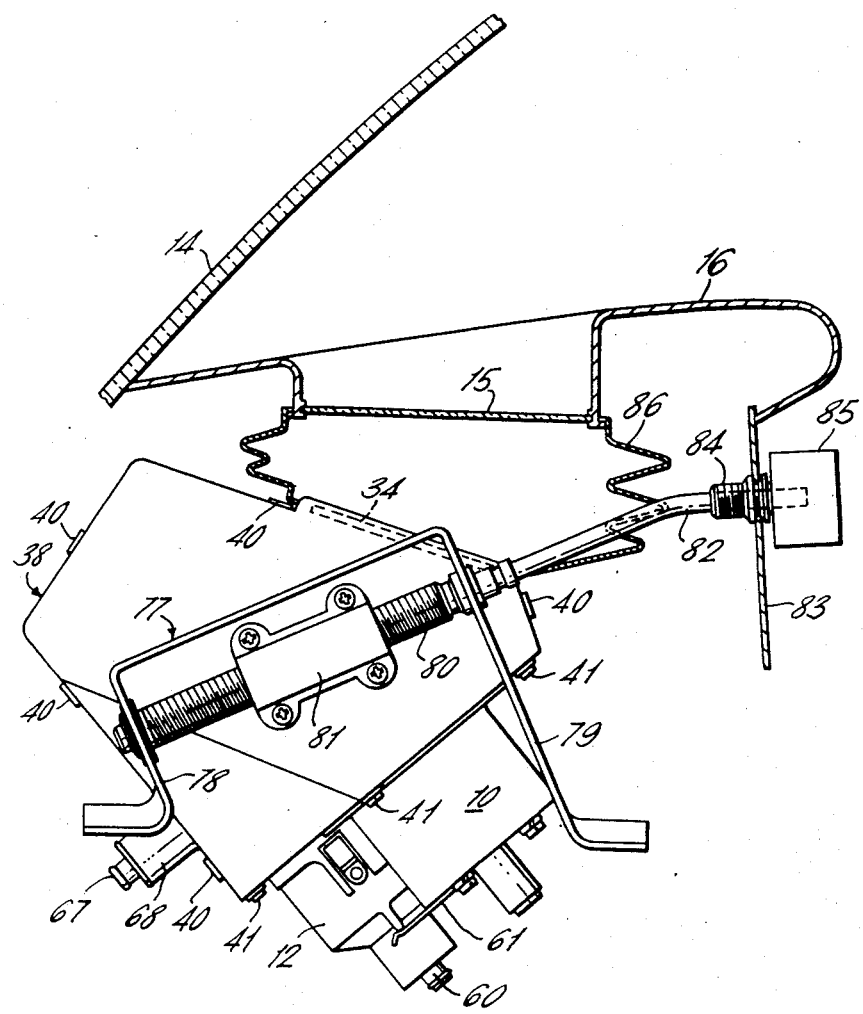
FIG. 9 is a part-sectional side view showing schematically a method of mounting the assembly of FIG. 6 in the automobile.

One possible method of mounting the head-up display assembly of FIG. 6 in an automobile is shown in FIG. 9. This particular method has the advantage that it allows the position of the projected display seen by the automobile driver to be readily adjusted in a vertical direction.

Referring to FIG. 9, a bracket 77, having parallel arms 78 and 79, is mounted on a suitable supporting structure (not shown) beneath the dashboard coping 16. The exact form of the bracket 77 depends on the particular make and type of automobile in which it is fitted. A threaded shaft 80 extends between the arms 78 and 79 and is rotatably secured in the arms 78 and 79. The thread on the shaft 80 engages a half-nut 81 which is secured to a block (not shown) on the side of the housing 38. The block has a semi-circular, unthreaded groove formed in its outer surface to accomodate the threaded shaft 80. A flexible shaft 82 is swaged to the end of the threaded shaft 80 which faces a dashboard panel 83 of the automobile. The flexible shaft 82 extends through a mounting bush 84 in the panel 83 and has a knob 85 fixed to its free end. A second grooved block (not shown), similar to the first block (to which the half-nut 81 is screwed), is present on the side of the housing 38 opposite the side carrying the first block. A blank rod (not shown) slidingly engages the groove in the second block, and is held parallel to the threaded shaft 80 by a bracket (not shown) similar to the bracket 77.

Rotation of the knob 85 causes the half-nut 81 to traverse the threaded shaft 80, in a direction dependent on the sense of rotation of the knob 85. The head-up display assembly is free to move with the half-nut 81 along a path parallel to the axis of the threaded shaft 80, and hence the head-up display assembly may be moved generally backwards or forwards relative to the windscreen 14 by rotation of the knob 85.

As the head-up display assembly is moved backwards or forwards in this manner, the point on the windscreen 14 at which the light from the head-up display assembly is reflected towards the automobile driver will move respectively up or down the windscreen 14. Hence the driver may readily adjust the vertical position of the projected display in his field of view.

The space between the windows 15 and 34 is bounded by an opaque, flexible bellows 86 to prevent ingress of unwanted light into that space.

Various modifications may be made to the forms of head-up display apparatus described without exceeding the scope of the invention. For example, the spherical mirror 13 may be replaced by a parabolic mirror. Also, the area of the windscreen 14 on which the display is projected may be coated with a thin film of, for example, bismuth oxide, indium oxide or titanium dioxide to increase the reflectivity of the windscreen 14 in that area. Such a film increases the brightness of the projected display, and also reduces the intensity of unwanted reflections from the outer surface of the windscreen 14. It has also been found that the provision of such a film has the incidental advantage of making the coated area of the windscreen 14 less susceptible to misting caused by condensation of water vapour.

We claim:

1. A head-up display apparatus for a motor vehicle comprising a curved windscreen for the vehicle, a speedometer having a datum mark and numeric characters movable relative to the datum mark in response to the speed of the vehicle, a source of collimated light for illuminating said datum mark and at least a portion of said numeric characters adjacent to said datum mark, a convex mirror, and a diverging lens positioned to project said illuminated datum mark and numeric characters onto said convex mirror, said curved windscreen being positoned to receive the image of said datum mark and of said characters reflected from said convex mirror to cause a display of the speed of the vehicle which appears to an observer to emanate from a position which is a finite distance from the observer.

2. Apparatus as claimed in claim 1 including a colored filter in the optical path of said diverging lens.

3. Apparatus as claimed in claim 2 wherein said light source comprises a pair of lamps, and a switch connected to energize either one or both of said lamps in accordance with the ambient light conditions.

4. A head-up display apparatus for projecting a display of the speed of a vehicle to an observer in the vehicle, the apparatus comprising a curved windscreen for the vehicle, a speedometer carrying numeric characters movable in response to the speed of the vehicle, a source of collimated light for illuminating at least one of said numeric characters, a masking plate defining an aperture for limiting the angular extent of the illuminated portion of the numeric characters to be projected, a spherical mirror, a diverging lens arranged to project the image of said illuminated characters onto said spherical mirror, and a plane mirror positioned to receive the reflected image from said spherical mirror and to reflect the latter onto said curved windscreen so as to cause a display of the speed of the vehicle which appears to emanate from a position which is a finite distance from the observer.

5. Apparatus as claimed in claim 4, wherein said light source comprises a first bulb mounted at the focus of an approximately parabolic mirror, and a second bulb adjacent said first bulb for selectively providing additional intensity of illumination.

6. Apparatus as claimed in claim 5 including a third bulb, and means adjacent said third bulb providing a datum mark in the optical path of said diverging lens whereby illumination of said third bulb causes said datum mark to appear on the projected display.

7. A head-up display apparatus for a vehicle for projecting a display of the speed of the vehicle to an observer in the vehicle, comprising a curved windscreen, a speedometer including an opaque disc provided with translucent gaps forming the numeric characters of a speedometer scale, a source of collimated light arranged to illuminate a portion of said disc and a datum mark, a diverging lens, a convex spherical mirror arranged to project an image of said datum mark and at least part of said illuminated portion onto said spherical mirror, and a plane mirror arranged to receive the image of said datum mark and said illuminated portion reflected by said spherical mirror and to reflect said image onto said curved windscreen so as to cause a display of said image which appears to the observer to emanate from a position a finite distance farther away from the observer than said curved windscreen.

8. A head-up display apparatus for a vehicle for projecting a display of the speed of the vehicle to an observer in the vehicle, the apparatus comprising a curved windscreen, a speedometer having an opaque disc provided with translucent gaps forming the numeric characters of the speedometer scale, a source of collimated light arranged to illuminate a portion of said disc and a datum mark, a masking plate defining an aperture for limiting the angular extent of the illuminated portion of the speedometer disc to be displayed, a convex spherical mirror, a diverging lens arranged to project the image of the illuminated characters as defined by said masking plate onto said spherical mirror, a colored filter in the optical path of said diverging lens, and a plane mirror arranged to receive the reflected image from said spherical mirror and to reflect the latter onto said curved windscreen so as to cause a display of the speed of the vehicle which appears to emanate from a position which is a finite distance from the observer.

9. Apparatus as claimed in claim 8 wherein said windscreen is coated with a reflective coating.

10. Apparatus as claimed in claim 9 wherein said reflective coating is selected from bismuth oxide, indium oxide and titanium oxide.

11. The head-up display apparatus of claim 8 wherein said source of collimated light comprises a lamp mounted in an approximately parabolic mirror, said apparatus including a translucent plate carrying a second datum mark in the optical path of said diverging lens and a second light source for illuminating said second datum mark, whereby the light reflected from said spherical mirror onto said curved windscreen produces a composite display of the speed of the vehicle and of said second datum mark.

12. A head-up display apparatus for a motor vehicle for projecting a display of the speed of the vehicle to the driver of the vehicle, the apparatus comprising a curved windscreen for the vehicle, a speedometer comprising an opaque disc provided with translucent gaps forming the numeric characters of a speedometer scale, a lamp mounted in an approximately parabolic mirror to provide a collimated light source positioned to illuminate a portion of the speedometer disc and an associated datum mark, a masking plate defining an aperture for limiting the angular extent of the illuminated portion of the speedometer disc to be displayed, a convex spherical mirror, a diverging lens arranged to project the image of the illuminated characters as defined by said masking plate onto said spherical mirror, a plane mirror arranged to receive the reflected image from said spherical mirror, and a window in the dashboard coping of said motor vehicle, said plane mirror being positioned to receive the reflected image from said spherical mirror and to reflect the latter onto said curved windscreen through said window so as to cause a display of the speed of the vehicle which appears to emanate from a position which is a finite distance from the driver.

13. A head-up display apparatus for a motor vehicle for projecting a display of the speed of the vehicle to the driver of the vehicle, the apparatus comprising a curved windscreen for the vehicle, a housing, a speedometer mounted within said housing and having an opaque disc provided with translucent gaps forming the numeric characters of the speedometer scale, a first lamp mounted in an approximately parabolic mirror so as to provide a collimated light source for illuminating a portion of the speedometer disc and an associated datum mark, a masking plate defining an aperture for limiting the angular extent of the illuminated portion of the speedometer to be displayed, a convex mirror, a diverging lens arranged to project the image of the illuminated characters as defined by said masking plate onto said convex mirror, a translucent plate carrying a second datum mark in the optical path of said diverging lens, a second lamp for illuminating said second datum mark, and a plane mirror arranged to receive the reflected image from said convex mirror and to reflect the latter onto said curved windscreen so as to cause a display of the speed of the vehicle and of said second datum mark which appears to emanate from a position which is a finite distance from the driver, means for mounting said housing flexibly beneath the dashboard coping of said vehicle, a screw threaded rod projecting into said dashboard coping, and a nut cooperating with said screw threaded rod and mounted on said housing for adjusting the angular position of said housing relative to said dashboard coping to cause an adjustment of the position of the display as seen by the driver.

14. The apparatus of claim 13 wherein said convex mirror is a spherical mirror, and a colored filter in the optical path of said diverging lens.

15. The apparatus of claim 14 including means for selectively changing the color of said filter.

16. A head-up display for a motor vehicle for projecting a display of the speed of the vehicle to the driver of the vehicle, the apparatus comprising a curved windscreen for the vehicle, a housing arranged to be mounted with freedom for movement beneath the dashboard coping of the vehicle, a window in the dasboard coping, a speedometer mounted within the housing, said speedometer including an opaque disc provided with translucent gaps forming the numeric characters of a speedometer scale, a lamp mounted within an approximately parabolic mirror positioned to provide a collimated light source for illuminating a portion of the speedometer disc and an associated datum mark, a masking plate defining an aperture for limiting the angular extent of the illuminated portion of the speedometer to be displayed, a convex spherical mirror, a diverging lens arranged to project an image of the illuminated characters as defined by said masking plate onto said spherical mirror, and a plane mirror arranged to receive the reflected image from said spherical mirror and to reflect the image through said window onto said curved windscreen so as to cause a display of the speed of the vehicle which appears to emanate from a position which is a finite distance from the driver.

17. A head-up display apparatus as claimed in claim 16 and further including a colored filter mounted in said housing in the optical path of said diverging lens, a translucent plate mounted in said housing carrying a second datum mark in the optical path of said diverging lens, and a second lamp for illuminating said second datum mark.

* * * * *